Figure 2:
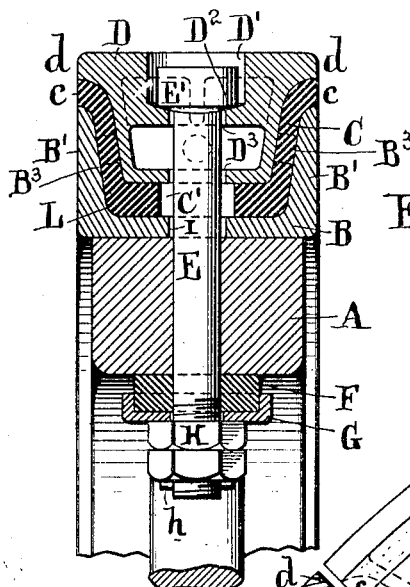

E. S. LEA.
AUTOMOBILE WHEEL.
APPLICATION FILED NOV. 4, 1907.

913,522.

Patented Feb. 23, 1909.
2 SHEETS—SHEET 1.

Inventor
Edward S. Lea

Witnesses
Daniel Webster, Jr.
A. M. Kelly

By
Attorney

E. S. LEA.
AUTOMOBILE WHEEL.
APPLICATION FILED NOV. 4, 1907.

913,522.

Patented Feb. 23, 1909.
2 SHEETS—SHEET 2.

Witnesses
Daniel Webster, Jr.
R. M. Kelly

Inventor
Edward S. Lea
By
Attorney

UNITED STATES PATENT OFFICE.

EDWARD S. LEA, OF TRENTON, NEW JERSEY, ASSIGNOR, BY MESNE ASSIGNMENTS, TO ROBERT WOLSTENHOLME, OF PHILADELPHIA, PENNSYLVANIA.

AUTOMOBILE-WHEEL.

No. 913,522.

Specification of Letters Patent.

Patented Feb. 23, 1909.

Application filed November 4, 1907. Serial No. 400,473.

*To all whom it may concern:*

Be it known that I, EDWARD S. LEA, resident of the city of Trenton, county of Mercer, and State of New Jersey, have invented an Improvement in Automobile-Wheels, of which the following is a specification.

My invention has reference to automobile wheels, and consists of certain improvements which are fully set forth in the following specification and shown in the accompanying drawings, which form a part thereof.

Many attempts have been made to provide a durable and inexpensive construction of automobile wheel which shall embody reasonable flexibility coupled with strength and resistance to wear; in this direction wheels have been designed having sectional tires of metal supported upon coil and other springs and attached to the felly of the wheel, but have proved unsatisfactory when subjected to the severe duties incident to commercial use; and it has also been the practice in heavy traction work to employ wheels in which the felly was provided with channel iron rims supporting heavy solid rubber tires, single or in sets of two or more arranged side by side, but these are costly, quickly wear away, and are unsuitable for use in the snow during winter weather.

The object of my invention is to provide a construction of automobile wheel which will overcome the objections heretofore experienced in the commercial use of traction wheels by combining a metallic or other hard tread portion in sections to conform to the surface conditions while adapted to resist wear, and securing these sections to the wheel proper with provision for yielding under pressure, whereby elasticity, durability, ease of repair, and strong tractile contact are secured.

My invention consists of a metallic tire arranged about the wheel proper and having pockets circumferentially arranged, combined with independent tread blocks fitting into the pockets and held yieldingly therein by bolts, and interposed elastic cushions between the tread blocks and sides and bottom of the pockets; further, in forming the pockets, cushions and tread blocks tapering in the plane of the rotation of the wheel or transversely thereto or both, whereby the depression of the tread blocks will put the elastic cushions under compression; further in providing the cushions in the above construction with a series of depressions or apertures to provide spaces into which the compressed rubber forming the cushion may expand.

My invention also consists of details of construction which, together with the features above specified, will be better understood by reference to the drawings, in which:—

Figure 1:
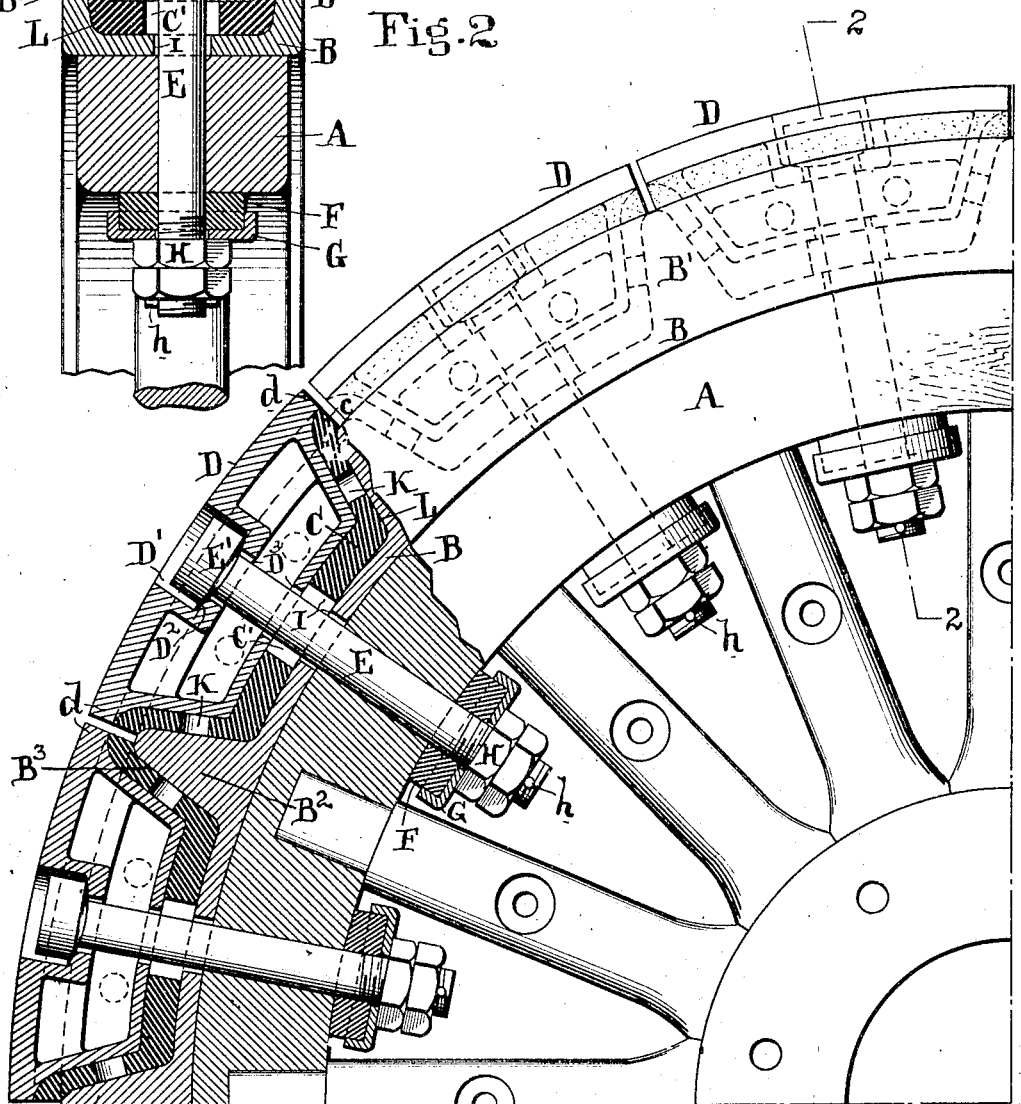
Figure 3:
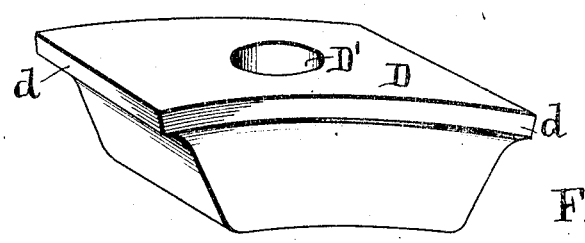
Figure 4:
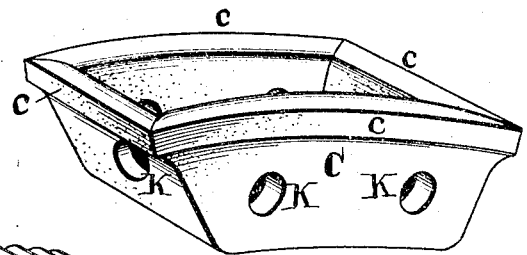
Figure 5:
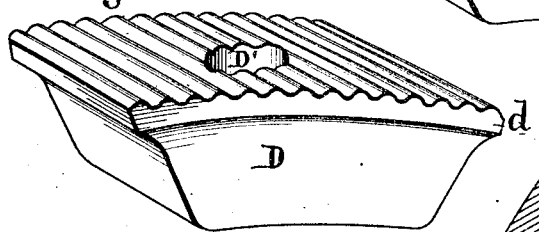
Figure 6:
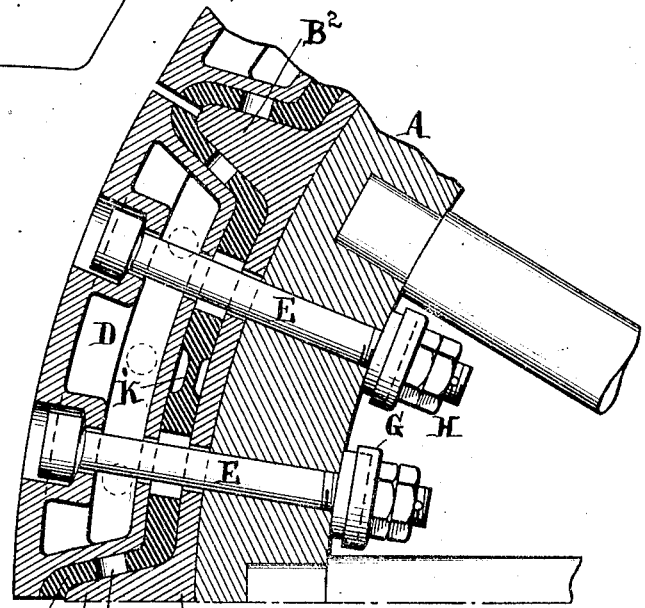

Figure 1 is a side elevation of one quarter of a wheel, with part in section, embodying my improvements; Fig. 2 is a cross section of the felly and tire of the same on line 2—2; Fig. 3 is a perspective view of one of the tread blocks removed; Fig. 4 is a perspective view of one of the rubber cushions removed; Fig. 5 is a perspective view of a modified form of tread block; and Fig. 6 is a sectional elevation of a portion of a wheel embodying a modified form of my invention.

A is the rim or felly of the wheel and may be of wood or of other material, as the wheel proper may be constructed in any manner desired. Secured to the periphery of the wheel and preferably shrunk upon the felly thereof is a metal tire B. The tire B is formed with two sides B' and a series of transverse walls B² at intervals throughout its circumference, to form a series of pockets L, opening outward and having inside walls which are preferably tapering as indicated at B³. I prefer that the outer edges of the sides and transverse walls shall be rounded so as not to cut or injure the rubber which rests against them and which receives the pressure of the working shoe or tire-block. This tire is preferably made of rolled steel, but may be made of cast metal, malleable or otherwise, and integral or in bent-up form, as will be readily understood by those skilled in the art.

Fitting into each of the pockets L is a box-shaped cushion part C of rubber or other yielding or elastic material; and this part C is so shaped that it fits down into and snugly rests against the bottom and walls of the pocket and is further provided with outwardly directed flanged edges c which preferably rest over the outer edges of the sides as well as the transverse portions of the tire. If the walls of the pockets on the inside are tapering, then it is desirable to also shape or mold the coöperating walls of the part C with tapered walls, but inversely to the walls B³.

Fitting into the several box-shaped cushion parts C of yielding material, I arrange a corresponding series of shoes or tire-blocks D which are independently supported in the respective pockets and yieldingly sustained by the rubber parts C, which constitute an elastic lining to the pockets. These shoes D are preferably tapering on their under and inner surfaces and have flanges $d$ at the outer edges which may overlap and rest upon the flanged parts $c$ of the part C hereinbefore described. In this way, the shoe D is supported, on all but its outer surface, directly by the rubber part C and indirectly by the tire pockets through the media of the elastic lining or cushion provided by said part C. All contact between the shoe and part C is formed by flat or rounded surfaces to prevent all danger of cutting the rubber of which part C is composed and also to enable the rocking motions of the shoe D relatively to the tire to take place more freely under the influences brought into play during the normal commercial use of the wheel. These shoes are preferably of metal and may be cast hollow for lightness.

The shoes D are each secured in place by one or more bolts E, which extend radially through the wheel felly A, the tire B, the rubber part C, and the shoe D. These bolts have heads E′ made with spherical under surfaces which rest upon spherical bottoms $D^2$ of sockets D′ in the shoes in which the heads of the bolts are located and by which they are shielded. In this manner, there is a ball and socket joint formed between the bolt head and shoe and by which provision the shoe may have capacity for adjusting itself under pressure, in use. The shank of the bolt E should fit loosely in the hole $D^3$ in the shoe that said shoe may not be held against a reasonable degree of oscillation. This bolt E also extends through large holes I in the tire B and C′ in the rubber part C, so that it is free to spring to a slight extent under any forward or backward shifting of the shoe D under extreme conditions of duty. The bolts E extend through the felly and are provided with cup-shaped washers G which support and clamp rubber washers F which are located between the cup-shaped washers G and the felly. These bolts are also preferably provided with a nut and lock-nut at H and, if desired with a cotter pin $h$. By this means, the shoes D may be clamped down into the pockets L with any pressure desired and yet under no conditions are the shoes held against reasonable free adjustments to conform to the requirements of commercial practice. While I prefer to use the washers F when made of rubber, they may be made in any other way or omitted, if desired.

The rubber parts C may be provided with holes K as well as the holes C′ or with recesses such as K′ (Fig. 6) into which the body of the rubber may be expanded under great compression and thereby permit the employment of rubber of cheaper quality than would otherwise be required. As all of the elastic parts C or F are subjected to compressive strains only, it is evident that a low grade rubber would be amply sufficient, especially as provision is made for practically confining the rubber and of avoiding cutting into or abrading the same.

In Fig. 6, I have shown the employment of two retaining bolts E for each shoe D, and therefore, though I prefer a single bolt for each shoe, I reserve the right to employ more than one bolt, these modifications being dependent both upon the size of the wheel and the duty which it is destined to perform in commercial use. The general cross section of the built-up tire is rectangular, and hence occupies small space and is strong.

While a smooth outer surface or tread to the shoes D is capable of providing traction sufficient under normal conditions of spring, summer and autumn weather, nevertheless, in winter when snow or ice is upon the ground, it is necessary to increase the frictional contact of the shoe therewith and to secure such result I prefer to roughen the outer tread surface of the shoe by making it corrugated or ribbed as shown in Fig. 5, or otherwise.

It will now be understood that, in the use of my improved wheel with vehicles carrying on commercial traffic, when at rest the pressure of the shoe will be inward radially, but this will be somewhat modified when the pressure comes jointly upon adjacent ends $d$ of two adjacent shoes. During the propulsion of the vehicle, the said shoes will take on a rocking motion in the plane of rotation of the wheel, but at all times subjecting the rubber cushions to compression. All of the actual wear comes upon the metallic surface of the shoes and consequently the life of the wheel will be very great. There is nothing to break and either or both of the parts C and D may be easily and cheaply replaced when worn or deteriorated, such as caused by the setting of the rubber. It is also apparent that because of the transverse walls or abutments $B^2$ there is no possibility of the shoes becoming displaced circumferentially, nor of subjecting the bolts E to undue strain.

A wheel of this character is most excellently adapted to all rough work and has advantages not inherent in ordinary wheels, namely, for example, if it were required to cross a track diagonally as in turning into and out of car tracks, the depression of the rear end of one shoe will present the forward edge of the next shoe in advance further out radially and hence in position to reach over the edge of the rail to be mounted, thereby causing the wheel to easily take hold of the rail to cross it. A wheel of this character is less liable to "skid" or slide sidewise than is a pneumatic rubber tire or any tire in which the outer surface is continuous, and consequently my improved wheel is most excellently adapted to speedy turning of corners while carrying heavy loads.

In place of using metal for the shoes or tire-blocks D, they may be made of tough wood or other tenacious solid material or composition.

I have described my invention in the form which I have found most adapted to the conditions of commercial traffic and while I prefer said construction, it will be evident to those skilled in the art that the details thereof may be modified without departing from the spirit of the invention.

Having now described my invention, what I claim as new and desire to secure by Letters Patent, is:—

1. In an automobile wheel, a metal tire formed of one piece having a series of pockets circumferentially arranged and opening outward, combined with independent shoes having parts respectively fitting into said pockets, intermediate yielding box shaped cushions respectively arranged between the walls and bottom of the pockets and shoes, so that the shoes are supported by rubber on sides and bottom, and means for holding the shoes in yielding position, whereby the shoes may independently oscillate slightly to adapt themselves to the surface over which they are traveling.

2. In an automobile wheel, a metal tire formed of one piece having a series of pockets circumferentially arranged with tapered walls and opening outward, combined with independent shoes having tapered parts fitting into said pockets, intermediate yielding box shaped cushions of rubber arranged in a continuous manner between the walls and bottom of the pockets and shoes, and means for holding the shoes in yielding position, whereby the shoes may independently move slightly to adapt themselves to the surface over which they are traveling.

3. In an automobile wheel, a continuous metal tire having a series of pockets circumferentially arranged with tapered walls and opening outward, combined with independent shoes having tapered parts fitting into said pockets and lateral flanges $d$ at the outer portion, intermediate yielding box shaped cushions of rubber arranged between the side walls and bottom of the pockets and shoes and having flanges $c$ arranged between the flanges of the shoe and tire, and means for holding the shoes in yielding position, whereby the shoes may independently move slightly to adapt themselves to the surface over which they are traveling.

4. In an automobile wheel, a continuous metal tire formed of a solid ring structure having a series of pockets circumferentially arranged and opening outward, combined with independent shoes having parts fitting into said pockets, intermediate yielding box shaped cushions arranged between the walls and bottom of the pockets and shoes, and means for holding the shoes yieldingly in position whereby the shoes may independently move slightly to adapt themselves to the surface over which they are traveling, said means consisting of bolts extending through the shoes, yielding cushions and tires and having nuts for holding the bolts in position.

5. An automobile wheel having the tire portion provided with a series of rigidly united pockets circumferentially arranged and opening outward, combined with box-shaped rubber linings to said pockets fitting the bottom and sides thereof in a continuous manner, and independent shoes closely fitting the interior sides and bottom surfaces of said rubber linings and having traction surfaces projecting beyond them.

6. In an automobile wheel, a metal tire having a series of pockets circumferentially arranged and opening outward, combined with box-shaped rubber linings to said pockets provided with a series of places in the body of the said linings from which the rubber is removed to form spaces within the linings into which the compressed lining may expand, independent shoes closely fitting the interior of said rubber linings and having traction surfaces projecting beyond, and means for holding the shoes in the rubber linings and pockets.

7. In an automobile wheel, the combination of a continuous metal tire having integral side walls and transverse walls to divide the circumferential space between the side walls into a series of tapered pockets, independent shoes extending into the several pockets and having end flanges $d$ which extend toward each other in pairs over the transverse walls, interposed tapered box-shaped rubber parts between the walls of the pockets and the body of the shoes and having flanges $c$ at their ends arranged between the end flanges $d$ of the shoes and the transverse walls, and means for yieldingly holding the shoes in position upon the tire.

8. In an automobile wheel, the combination of a continuous metal tire formed of one piece having integral side walls and transverse walls to divide the circumferential space between the side walls into a series of pockets, independent shoes extending into the several pockets and having end flanges $d$ which extend toward each other in pairs over the transverse walls, interposed box-shaped rubber parts between the walls and bottom of the pockets and the body of the shoes and having flanges $c$ at their ends arranged between the end flanges $d$ of the shoes and the transverse walls, and means for yieldingly holding the shoes in position upon the tire consisting of bolts extending through the shoes, box-shaped rubber parts, tire and felly, and yielding locking devices upon the inside of the felly for drawing the bolts inward with yielding pressure.

9. A yielding cushion for the shoes of an automobile wheel having pockets in its tire and shoes adapted to the pockets which consists of a box-shaped rubber cushion having continuous bottom and sides the cushion being open at the top and having one or more holes in its bottom for the retaining bolts.

10. A yielding cushion for the shoes of an automobile wheel having pockets in its tire and shoes adapted to the pockets which consists of a tapered box-shaped rubber cushion having continuous bottom and sides the cushions being open at the top and provided on the outer edges of two opposite walls with flanges $c$, and having one or more holes in its bottom for the retaining bolts.

11. A yielding cushion for the shoes of an automobile wheel having pockets in its tire and shoes adapted to the pockets which consists of a box-shaped rubber cushion having bottom and perforated sides and made open at the top and having one or more holes in its bottom for the retaining bolts.

12. A yielding cushion for the shoes of an automobile wheel having pockets in its tire and shoes adapted to the pockets which consists of a tapered box-shaped rubber cushion having continuous bottom and sides and open at the top also provided on the outer edges of all the walls with outwardly directed flanges $c$, and having one or more holes in its bottom for the retaining bolts.

13. In an automobile wheel, the combination of a tire having pockets arranged circumferentially and separated by transverse walls, with box-shaped cushion linings for the pockets, shoes fitting into the cushion linings and each having a hole for a retaining bolt terminating in a socket for the bolt head made spherical on the bottom, and bolts for holding the shoes in position having heads formed with spherical under surfaces to adjustably engage the sockets whereby the shoes may oscillate in all directions upon the cushion linings.

14. A replaceable shoe for an automobile wheel, which consists of an integral block curved on its outer surface and having an under tapered body provided with a bolt hole and on all sides with bounding flanges $d$ adjacent to the curved outer surface and extending beyond the tapered body.

15. A replaceable shoe for an automobile wheel which consists of a hollow block having a curved outer corrugated wall bounded by flanges, and having an under tapered body within the area of the flanges and provided with a bolt hole extending radially through the outer wall and bottom of the shoe and enlarged at its outer end within the outer wall.

16. An automobile wheel in which the felly is provided with a built-up tire having inner and outer metallic portions and interposed box-shaped rubber portions, the inner metallic portion being continuous and formed with pockets and the outer metallic portion being in sections and interposed rubber portions being in sections and fitting into the pockets so that the ends of the outer metallic sections come close together to form a substantially continuous metallic outer surface.

17. An automobile wheel in which the felly is provided with a built-up tire having inner and outer metallic portions and interposed box-shaped rubber portions, the inner metallic portion being continuous and formed with pockets and the outer metallic portion being in sections and interposed rubber portions being in sections and fitting into the pockets so that the ends of the outer metallic sections come close together to form a substantially continuous metallic outer surface, and independent means for securing each of the sections of the outer metallic portion in the pockets of the continuous inner portion and clamping between them the box-shaped rubber portions, whereby the sections of the outer metallic portion are permitted to yieldingly oscillate.

18. In an automobile wheel, a metal tire having a series of tapered pockets opening outward in a radial direction and being of the full width of the tire except for the side walls, combined with box-shaped rubber linings for said pockets having continuous sides and bottom, independent shoes having tapered portions tightly fitting upon the inner sides and bottom of the box shaped linings, and retaining means for holding the shoes yieldingly in place.

19. In an automobile wheel, a metal tire having a series of tapered pockets opening outward in a radial direction and being of the full width of the tire except for the said walls, combined with box-shaped rubber linings for said pockets having continuous sides and bottom and flanged at their outer edges as at $c$, independent shoes having outer flanged edges and inner tapered portions tightly fitting upon the inner sides and bottom of the box-shaped linings and having their flanges arranged to clamp the flanges $c$ of the rubber linings upon the outer surface of the tire, and retaining means for holding the shoes yieldingly in place.

20. In an automobile wheel, the combination of a tire portion having a series of outwardly directed tapered pockets and a circular inner surface, a series of independent box-shaped rubber linings for said pockets having continuous sides and bottom, independent shoes having tapered parts tightly fitting upon the sides and bottom of the rubber linings, and yielding means for holding the shoes in place.

21. In an automobile wheel, the combination of a tire portion having a series of outwardly directed tapered pockets and a circular inner surface, a series of independent box-shaped rubber linings for said pockets having continuous sides and bottom, independent shoes having tapered parts tightly fitting upon the sides and bottom of the rubber linings, a wheel part having a felly made with a circular outer surface, and yielding means for holding the shoes in place consisting of bolts extending through the shoes, rubber linings, tire and felly and having a yielding washer supported by the felly.

In testimony of which invention, I have hereunto set my hand.

EDWARD S. LEA.

Witnesses:
  M. F. DRISCOLL,
  R. M. KELLY.